(12) United States Patent
Noell

(10) Patent No.: US 9,636,928 B2
(45) Date of Patent: May 2, 2017

(54) APPARATUS FOR THE PRINTING AND RADIATION TREATMENT OF A CURVED SURFACE OF AN OBJECT

(71) Applicant: HEIDELBERGER DRUCKMASCHINEN AG, Heidelberg (DE)

(72) Inventor: Matthias Noell, Weiterstadt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 2 days.

(21) Appl. No.: 14/627,171

(22) Filed: Feb. 20, 2015

(65) Prior Publication Data

US 2015/0231897 A1    Aug. 20, 2015

(30) Foreign Application Priority Data

Feb. 20, 2014    (DE) .................. 10 2014 002 710

(51) Int. Cl.
| | |
|---|---|
| *B41J 2/01* | (2006.01) |
| *B41J 3/407* | (2006.01) |
| *B41J 29/12* | (2006.01) |
| *B41J 11/00* | (2006.01) |

(52) U.S. Cl.
CPC .............. *B41J 11/002* (2013.01); *B41J 2/01* (2013.01); *B41J 3/4073* (2013.01); *B41J 29/12* (2013.01)

(58) Field of Classification Search
CPC ............ B41J 2/01; B41J 3/4073; B41J 29/12
See application file for complete search history.

(56) References Cited

U.S. PATENT DOCUMENTS

| 7,350,890 B2 | 4/2008 | Baird et al. | |
|---|---|---|---|
| 7,370,955 B2 | 5/2008 | Yokoyama et al. | |
| 2003/0234848 A1* | 12/2003 | Ishikawa ................ | B41J 2/2117 347/102 |
| 2007/0062383 A1* | 3/2007 | Gazeau et al. ................. | 101/35 |
| 2008/0204536 A1* | 8/2008 | Suzuki .................. | B41J 11/002 347/102 |
| 2016/0167399 A1* | 6/2016 | Ohnishi .................... | B41J 2/01 347/102 |

FOREIGN PATENT DOCUMENTS

| DE | 102009058212 A1 | 6/2011 |
|---|---|---|
| DE | 102010034780 A1 | 2/2012 |

(Continued)

*Primary Examiner* — Kristal Feggins
*Assistant Examiner* — Kendrick Liu
(74) *Attorney, Agent, or Firm* — Laurence A. Greenberg; Werner H. Stemer; Ralph E. Locher

(57) ABSTRACT

An apparatus for the printing and radiation treatment of a curved surface of an object, such as a body part, includes a printing unit, preferably an inkjet print head, a radiation unit, preferably a UV dryer, and a movement unit, preferably a robot, either for moving the printing unit and the radiation unit at a working distance along the surface or for moving the object at a working distance along the printing unit and the radiation unit. A shielding unit can be adjusted and/or deformed relative to the printing unit and/or relative to the radiation unit and during the printing. Scattered radiation is shielded and damage to the printing unit is prevented as a result of the special configuration of the shielding unit.

15 Claims, 5 Drawing Sheets

(56) References Cited

FOREIGN PATENT DOCUMENTS

| DE | 102012010617 | A1 |   | 12/2013 |
|----|--------------|-----|---|---------|
| DE | 102012212469 | A1 |   | 1/2014  |
| EP | 1579995      | A1 |   | 9/2005  |
| EP | 1784262      | A1 |   | 5/2007  |
| JP | 2011073271   | A  | * | 4/2011  |
| WO | 2011072764   | A1 |   | 6/2011  |

* cited by examiner

APPARATUS FOR THE PRINTING AND RADIATION TREATMENT OF A CURVED SURFACE OF AN OBJECT

CROSS-REFERENCE TO RELATED APPLICATION

This application claims the priority, under 35 U.S.C. §119, of German Patent Application DE 10 2014 002 710.4, filed Feb. 20, 2014; the prior application is herewith incorporated by reference in its entirety.

BACKGROUND OF THE INVENTION

Field of the Invention

The present invention relates to an apparatus for the printing and radiation treatment of a curved surface of an object, in which the apparatus has a printing unit, a radiation unit, and a movement unit, either for moving the printing unit and the radiation unit at a working distance along the surface of the object or for moving the object at a working distance along the printing unit and the radiation unit.

When printing three-dimensional objects, it may be necessary to dry and/or to cure the imprint on the surface. For that purpose, a dryer can be guided along the object. The time interval between printing and drying/curing must be chosen so as not to be too short (the ink must have time to spread) and not too long (the ink must not run too much). If a printing unit and a drying/curing unit are guided together at a given working speed, then an optimum distance between the units results from the optimum time interval. If that optimum distance is small, a problem may occur which is that, when a radiation dryer/curer is used, scattered radiation bridges the distance and reaches the printing unit. There, the radiation can lead to undesired drying/curing of ink. In the worst possible case, it can lead to damage to the printing unit.

When a printing unit and a drying/curing unit are guided together, care must additionally be taken to ensure that neither of the two units collides with the surface of the object. An excessively great distance between the two units makes collision avoidance more difficult.

European Patent Application EP 1 579 995 A1, corresponding to U.S. Pat. No. 7,370,955, discloses a rigid housing for UV light sources. One wall of the housing is located between the light sources and an inkjet print head having nozzles. That wall is intended largely to prevent reflected UV radiation from reaching the print head and curing ink in the area of the nozzles. The light sources, the housing and the print head are disposed fixedly beside one another on a movable carriage, which moves along a paper to be printed. The paper has no curvature in the direction of movement of the carriage. The carriage therefore moves rectilinearly back and forth at a constant distance from the paper. Problems which can be attributed to the printing of curved surfaces are therefore not encountered.

An apparatus for printing is also known from European Patent Application EP 1 784 262 A1, corresponding to U.S. Pat. No. 7,350,890. The apparatus includes heads for expelling liquid and UV light sources adjacent thereto for polymerizing the liquid. The heads and the light sources are disposed jointly on a frame, which permits a movement along the object to be printed. The object can be, for example, an aircraft or the outer surface thereof. Mention is made that the light source can include a so-called "shutter." The latter serves to interrupt the emission of UV radiation and the polymerization process. Such an interruption can clearly be carried out without problems only when the printing is also interrupted at the same time. The shutter and the heads will therefore never be active at the same time.

SUMMARY OF THE INVENTION

It is accordingly an object of the invention to provide an apparatus for the printing and radiation treatment of a curved surface of an object, which overcomes the hereinafore-mentioned disadvantages of and is improved as compared to the heretofore-known apparatuses of this general type, which prints the curved surface without difficulty and which, during the printing, treats the curved surface with radiation without difficulty. In particular, the intention is for problems which can be attributed to scattered radiation to be effectively reduced or avoided during the printing.

With the foregoing and other objects in view there is provided, in accordance with the invention, an apparatus for the printing and radiation treatment of a curved surface of an object, comprising a printing unit, a radiation unit, a movement unit, either for moving the printing unit and the radiation unit at a working distance along the surface or for moving the object at a working distance along the printing unit and the radiation unit, and a shielding unit which can be adjusted and/or deformed relative to the printing unit and/or relative to the radiation unit and during the printing.

The apparatus advantageously makes it possible to print a curved surface without difficulty and to treat the curved surface with radiation without difficulty during the printing and, in particular, to effectively reduce or to avoid problems which can be attributed to scattered radiation during the printing.

Through the use of the shield configured and actuated in accordance with the invention, it is possible to achieve a situation in which no disruptive scattered radiation from the object surface reaches the printing unit. In particular, when inkjet print heads are used for UV ink, it is important to prevent scattering of radiation, since non-shielded scattered radiation (i.e. indirect radiation but also direct radiation) can cure UV ink in the area of the nozzles. As a result, the nozzles can be irreversibly blocked and damaged.

In addition, long printing webs can be printed without interruption and treated at the same time. Interruptions are avoided and productivity is increased. As a result, the number of web splices can be reduced. This increases the quality of the printed image.

Provision can also be made to move a plurality of printing units and a radiation unit jointly. In this case, the plurality of printing units can be protected by a single shielding unit for radiation. The shielding unit is then preferably disposed between the radiation unit and the printing unit disposed adjacent the latter.

An additional provision can be made for the printing units and radiation units (for the so-called pinning of the printing liquid) to be disposed to follow one another alternately and for a shielding unit to be disposed between each two of these units.

Furthermore, it is possible to move the radiation unit separately, e.g. by using an individual robot. The shielding unit can then be moved either together with the printing unit or with the radiation unit. Alternatively, each unit has an individual shielding unit.

A preferred development of the apparatus according to the invention can be distinguished by the fact that the printing unit is an inkjet print head and the radiation unit is an infrared dryer, an ultraviolet dryer or a hot air dryer.

A preferred development of the apparatus according to the invention can be distinguished by the fact that at least one actuator is provided, in particular a linear drive, to adjust and/or deform the shielding unit.

Alternatively, provision can be made for a passive configuration to be chosen instead of the active movement/deformation of the shielding unit. To this end, instead of the actuator, it is possible to provide a component which senses the object surface mechanically during the relative movement and moves/deforms the shielding unit appropriately at the same time.

A preferred development of the apparatus according to the invention can be distinguished by the fact that the printing unit and the radiation unit are disposed adjacent one another and, between one another, form a gap in which the shielding unit is disposed in such a way that it can be adjusted and/or deformed so that the shielding unit can be moved out of the gap and in again, at least to some extent, and/or deformed. The gap is preferably only a few centimeters wide, particularly preferably only about one centimeter wide.

A preferred development of the apparatus according to the invention can be distinguished by the fact that a control unit is provided which, during the movement of the printing unit and the radiation unit or during the movement of the object, activates the actuator in such a way that—by adjusting and/or deforming the shielding unit—the working distance between the shielding unit and the surface of the object remains within a predefined working range.

A preferred development of the apparatus according to the invention can be distinguished by the fact that the printing unit, the radiation unit and the shielding unit are disposed on the movement unit. The printing unit and the radiation unit are preferably disposed in a fixed manner, i.e. immovably, on the movement unit.

A preferred development of the apparatus according to the invention can be distinguished by the fact that the movement unit is a jointed-arm robot with a number of degrees of freedom, such as 3, 4, 5, 6 or 7, or a robot with a plurality of linear axes and axes of rotation.

A preferred development of the apparatus according to the invention can be distinguished by the fact that the shielding unit includes a plurality of plates, of which at least one is disposed in the gap and in each case at least one is disposed at the side of the printing unit and/or the radiation unit.

The invention as such and structurally and/or functionally advantageous developments of the invention will be described in more detail below with reference to the associated drawings and by using at least one preferred exemplary embodiment.

Other features which are considered as characteristic for the invention are set forth in the appended claims.

Although the invention is illustrated and described herein as embodied in an apparatus for the printing and radiation treatment of a curved surface of an object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
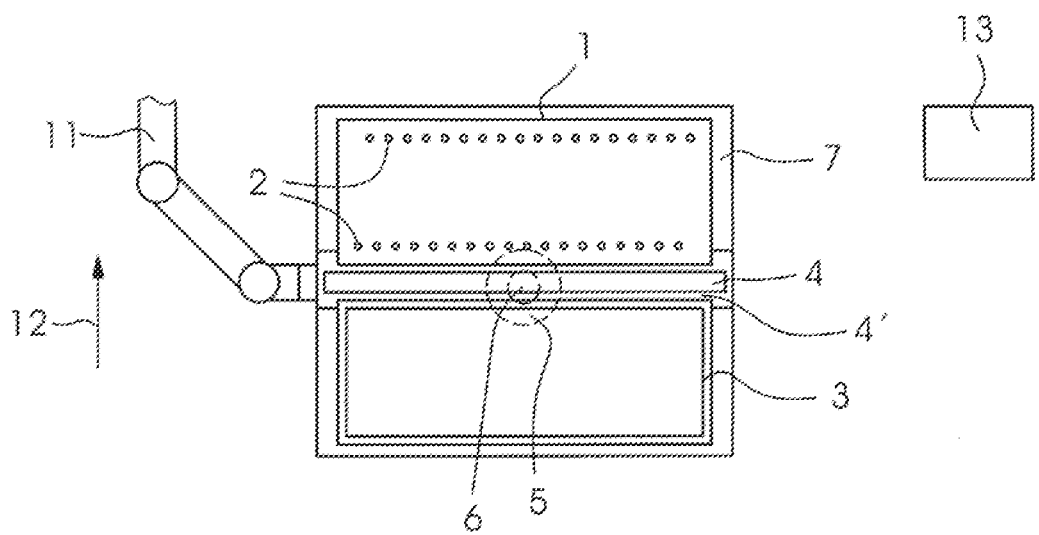
FIG. 1A is a diagrammatic, plan view of a preferred exemplary embodiment of an apparatus according to the invention.

Referring now in detail to the figures of the drawings, in which mutually corresponding elements are each provided with the same designations and first, particularly, to FIG. 1A thereof, there is seen a diagrammatic plan view of a preferred exemplary embodiment of an apparatus according to the invention. This embodiment includes a printing unit 1, which is preferably an inkjet print head having one row or several rows of nozzles 2. It is also possible to place a plurality of such print heads compactly behind one another, e.g. for printing a plurality of colors (CMYK). The nozzles expel ink 10 (see FIGS. 2A and 2B), preferably UV ink. Furthermore, the apparatus includes a radiation unit 3, which is preferably a dryer and particularly preferably a UV dryer. The dryer can have one or more UV lamps or a plurality of UV LEDs as UV dryers. The LEDs can be disposed, in a manner similar to the nozzles, beside one another in a row in the lateral direction with respect to a direction of movement 12. An object 8' (see FIGS. 2A-B and FIGS. 3A-E) to be printed can, in particular, be a (land, air, marine or space) vehicle or the outer or inner wall thereof, for example a body part or the like. Likewise, small objects such as balls, cases, bags or helmets can be printed.

Figure 2A:
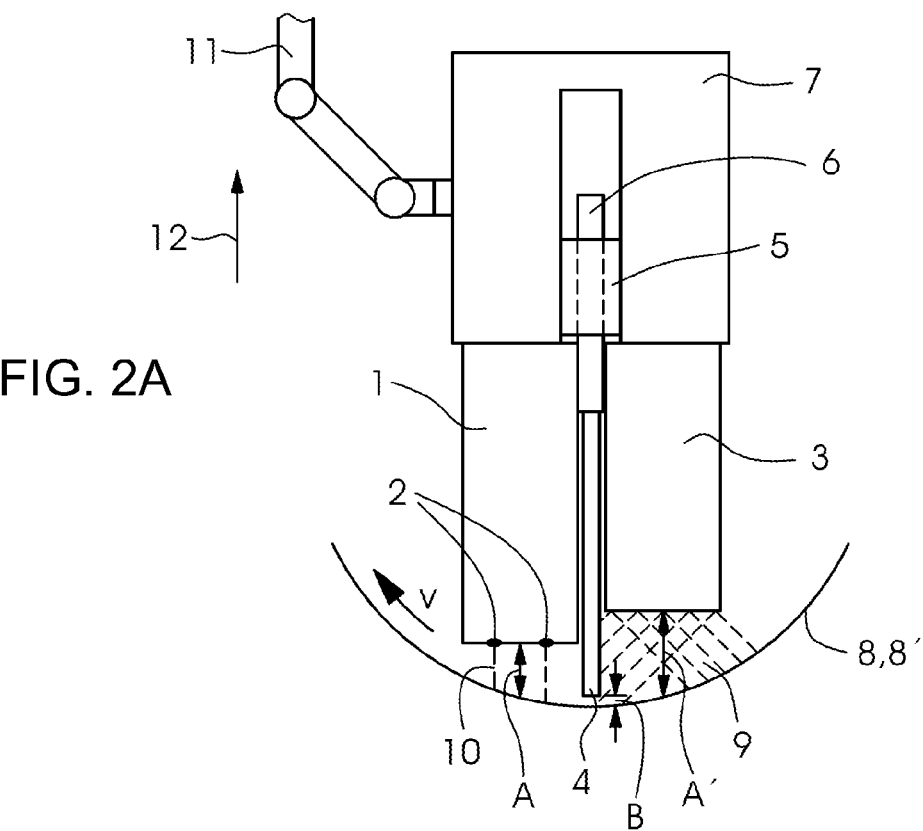
FIG. 2A is a diagrammatic, side-elevational view of the preferred exemplary embodiment of FIG. 1A when printing a concave surface.
Figure 2B:
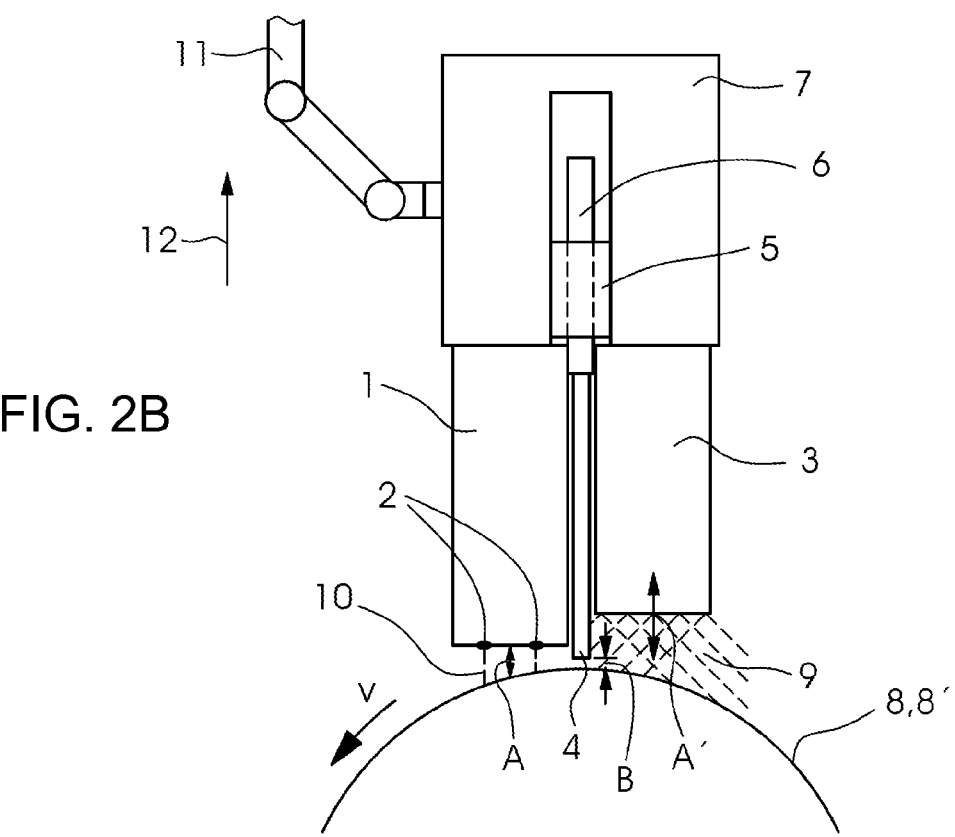
FIG. 2B is a diagrammatic, side-elevational view of the preferred exemplary embodiment of FIG. 1A when printing a convex surface.

The apparatus additionally includes a movement unit 11, preferably a jointed-arm robot, which moves the apparatus in the (local) direction of movement 12 on a curved path along a curved surface 8 of the object 8' (see FIGS. 2A, 2B). The movement is carried out at a working distance A, A' from the object surface 8. The working distance A of the printing unit 1 can differ from the working distance A' of the radiation unit 3. Both working distances can be varied during the movement but (in terms of open-loop or closed-loop control) are kept within a respectively predefined working range. The intention is to prevent a collision of the apparatus with the object from occurring or the distance becoming too great and, as a result, the printed result suffering. To this extent, the working distances A and A' are to be understood as average distances (e.g. averaging over the movement along a path or over the entire printing operation). In addition, the individual nozzles 2 or LEDs can also be at different distances from the object surface, e.g. if the surface has a curvature in the lateral direction. The average distance can therefore be based, for example, on a specific nozzle or LED at the edge or in the center of the printing unit or radiation unit.

The movement unit 11 can be activated through a non-illustrated control unit, to which stored or measured 3-D data about the surface 8 or control data based thereon is available. From this data, the path of the printing unit and also of the radiation unit can be calculated with computer assistance, e.g. in accordance with German Patent Application DE 10 2013 014 444, corresponding to U.S. patent application Ser. No. 14/474,460, filed Sep. 2, 2014. Starting from the knowledge of this path, the optimum local, i.e. location-dependent, positioning and/or shape of a shielding unit 4 can in turn be calculated with computer assistance. In a way similar to that in German Patent Application DE 10 2013 014 444, corresponding to U.S. patent application Ser. No. 14/474,460, filed Sep. 2, 2014, polynomials or polynomial series (so-called splines) can be used in order to describe the sequence of local positionings and/or shapes of the shielding unit and/or of selected points of the shielding unit.

During the movement, the printing unit 1 expels printing ink, paint, primer or preferably ink 10 (or else adhesive) in the direction of the object surface 8. The expulsion is carried out as a liquid jet or preferably as liquid droplets. The radiation unit 3 generates electromagnetic radiation 9 during the movement, preferably in the UV range, or particulate radiation 9, preferably hot air, and this radiation likewise strikes the object surface. The object surface is consequently both printed and also treated with radiation during the movement, preferably cured and/or dried. The radiation treatment is carried out preferably only at points on the surface at which there is an imprint.

The shielding unit 4 is disposed in the apparatus, between the printing unit 1 and the radiation unit 3 or in a gap 4' between the two units. A comparison with FIG. 2A, for example, makes it possible to see that the shielding unit is preferably a rigid plate, particularly preferably a metal plate. Alternatively, the shielding unit can be a type of flexible venetian blind or flexible roller blind, possibly metal-coated. The shielding unit preferably covers the entire area between the printing unit and the radiation unit. In addition, the shielding unit preferably projects a little further (about 5 to 10%) beyond this area. The shielding unit 4 has an edge 14 facing the object, at which the shielding unit can be angled over or have a bead or a T-shaped termination. In this way, the action of the shielding can additionally be improved.

The shielding unit 4 is disposed in such a way that it can move. An actuator 5 and a transmission unit 6 are provided in the apparatus in order to move the shielding unit. The actuator is preferably an electric polyphase motor or a linear motor, alternatively a pneumatic motor or the like. The transmission unit is preferably only a rod, alternatively a mechanism including levers, joints, guides etc., or possibly an expedient gearbox. The transmission unit 6 permits the movement or adjustment of the shielding unit 4 relative to the printing unit 1 and to the radiation unit 3. In the exemplary embodiment shown, the shielding unit is moved back and forth in the gap 4' (depending on the course of the object surface 8). In the process, the shielding unit is moved partly into the gap and partly out of the gap (see also FIGS. 2A and 2B).

The adjustable (or alternatively deformable) shielding unit 4 permits a distance B of the shielding unit 4 from the object surface 8 to be kept substantially constant during the movement of the apparatus along the object 8' within a predefined range. In this way, the distance can be kept small or even minimal (while avoiding collisions), preferably on the order of magnitude of about one millimeter. This in turn is used to shield the printing unit 1 against damaging (scattered) radiation 9 from the radiation unit. The apparatus has a control unit 13 for this purpose. The control unit 13 controls the actuator 5 during the movement of the apparatus in such a way that an (average) working distance B of the shielding unit between shielding unit and the object surface 8 remains within a predefined working range. Alternatively, a non-illustrated sensor can also be provided in the apparatus, for measuring the actual distance of the shielding unit from the object surface. The control unit (in this case a closed-loop control unit) then compares the actual value with a predefined intended value in a known way and, in the event of a deviation, generates appropriate control signals for the actuator for distance correction. The signals can correct or even replace control signals for the movement/deformation of the shielding unit.

Figure 1B:
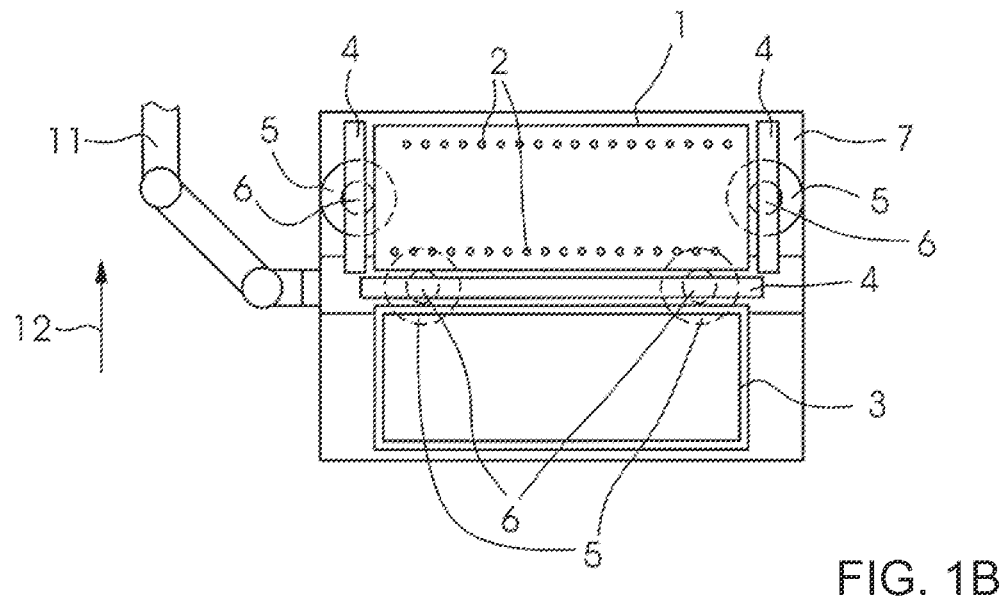
FIG. 1B is a diagrammatic, plan view of a further preferred exemplary embodiment of an apparatus according to the invention.

FIG. 1B shows a diagrammatic plan view of a further preferred exemplary embodiment of an apparatus according to the invention. This embodiment has not just one but three plates or the like as shielding units 4. Two of these plates are disposed in such a way that they cannot move in the gap 4' but only at the side of the printing unit 1. Alternatively, the two plates can also be disposed in such a way that they can move at the side of the radiation unit 3. Also conceivable would be a fourth plate, which shields the respective unit on the remaining fourth side. Each plate can preferably have an individual actuator and the movements of the plates can be controlled or regulated separately. Alternatively, all of the plates are moved together, preferably by one actuator.

FIGS. 2A and 2B each show a diagrammatic side view of the preferred exemplary embodiment of FIG. 1A when printing a concave or convex surface. It can be seen that the apparatus has a supporting unit 7, on which the printing unit 1 and the radiation unit 3 are disposed. The supporting unit is preferably disposed on the movement unit 11. The actuator 5 is preferably also disposed on the supporting unit 7, or alternatively on one of the units 1 or 3.

When printing a concave surface 8, the shielding unit 4, as can be seen, moves further out than when printing a convex surface. However, the working distance B remains substantially constant during the movement of the apparatus. It can be seen that, in both cases, advantageously no (or only unavoidably little) scattered radiation from the radiation 9 reaches the printing unit 1 from the object surface 8.

An arbitrarily shaped object surface 8 will have both concave and convex sections adjacent the path of the apparatus. To this extent, the shielding unit 4 is moved in and out repeatedly during the movement of the apparatus along the path. In other words: the shielding unit follows the contour or the course of the object surface (at the working distance) and shields the printing unit 1 effectively against scattered radiation. The shielding unit compensates for distance corrections of the printing unit 1 and the radiation unit 3 (e.g. for collision avoidance).

Figure 3A:
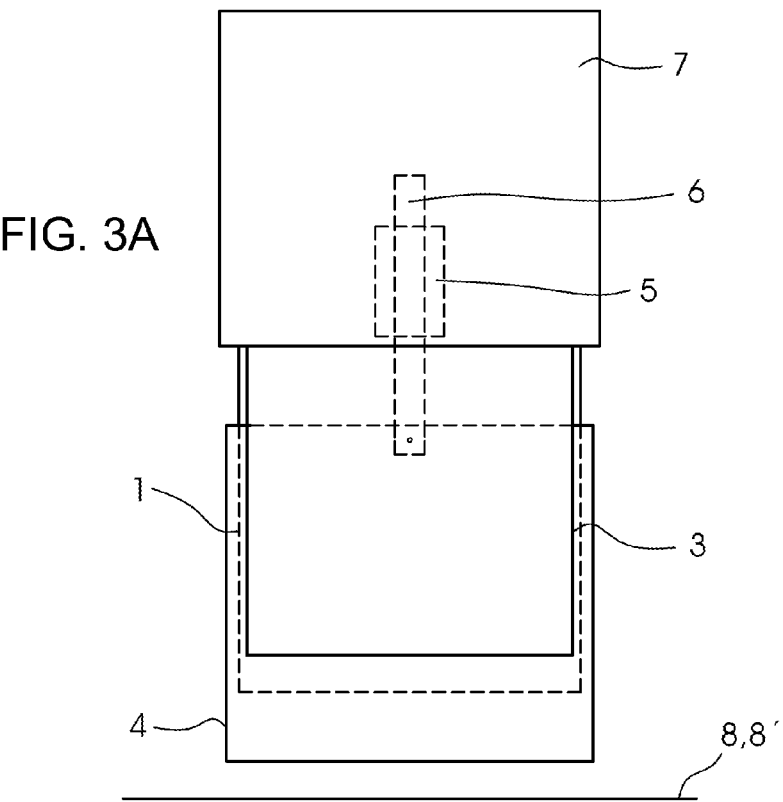
FIG. 3A is a diagrammatic, front-elevational view of the preferred exemplary embodiment of FIG. 1A.
Figure 3B:
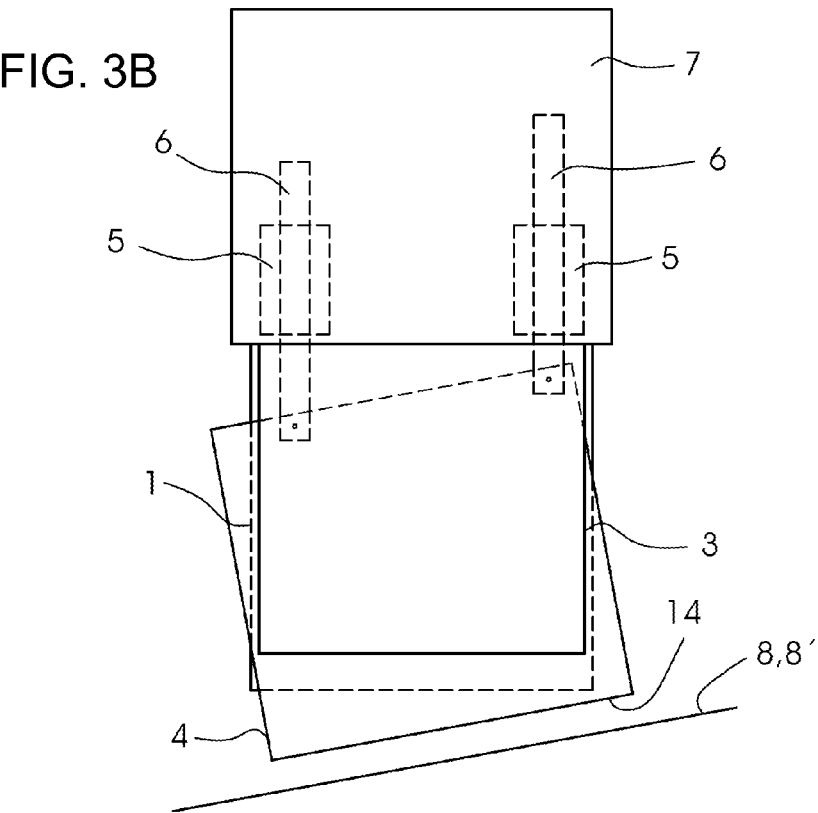
FIG. 3B is a diagrammatic, front-elevational view of a variant of the preferred exemplary embodiment of FIG. 1A.

FIGS. 3A and 3B each show a diagrammatic front view of the preferred exemplary embodiment of FIG. 1A. In FIG. 3A, the apparatus includes only one actuator 5. The latter moves the shielding unit 4 downward or upward (or toward/away from the object surface 8). In FIG. 3B, on the other hand, in a variant at least two actuators 5 are provided. These actuators not only permit the up and down movement but also pivoting or tilting of the shielding unit 4. In this way, the lower edge 14 of the shielding unit can be inclined in accordance with the local lateral inclination of the object surface 8. In other words: the angular position of the shielding unit or the edge thereof can be chosen optimally.

In this way, an improved shielding action is achieved. The actuators or the transmission units 6 can be connected to the shielding unit in an articulated manner.

The embodiments of FIGS. 3B to 3E have a plurality of degrees of freedom with regard to the movement/the deformation of the shielding unit 4.

Figure 3C:
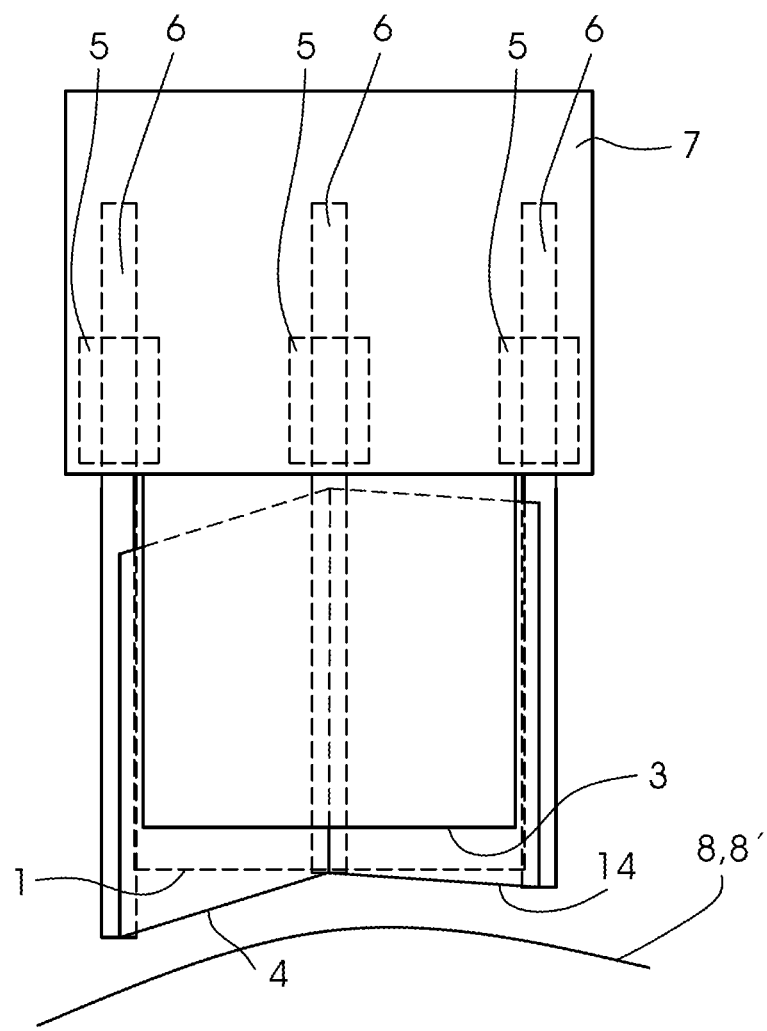
FIG. 3C is a diagrammatic, front-elevational view of a further preferred exemplary embodiment of an apparatus according to the invention.
Figure 3D:
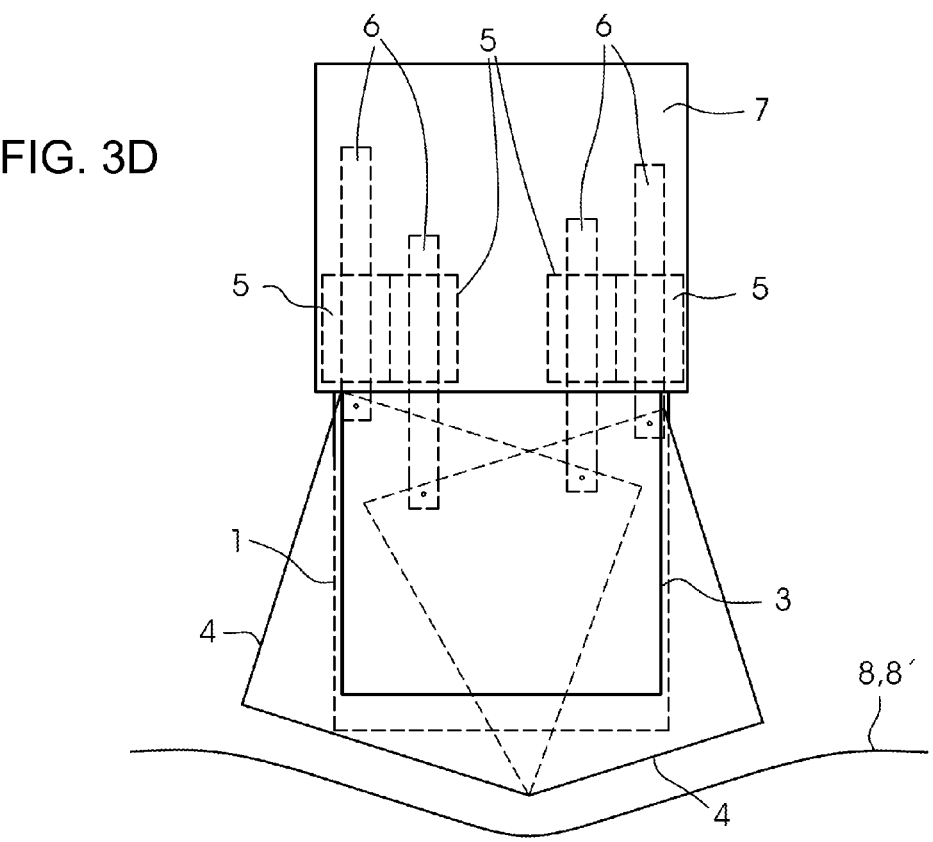
FIG. 3D is a diagrammatic, front-elevational view of a further preferred exemplary embodiment of an apparatus according to the invention.
Figure 3E:
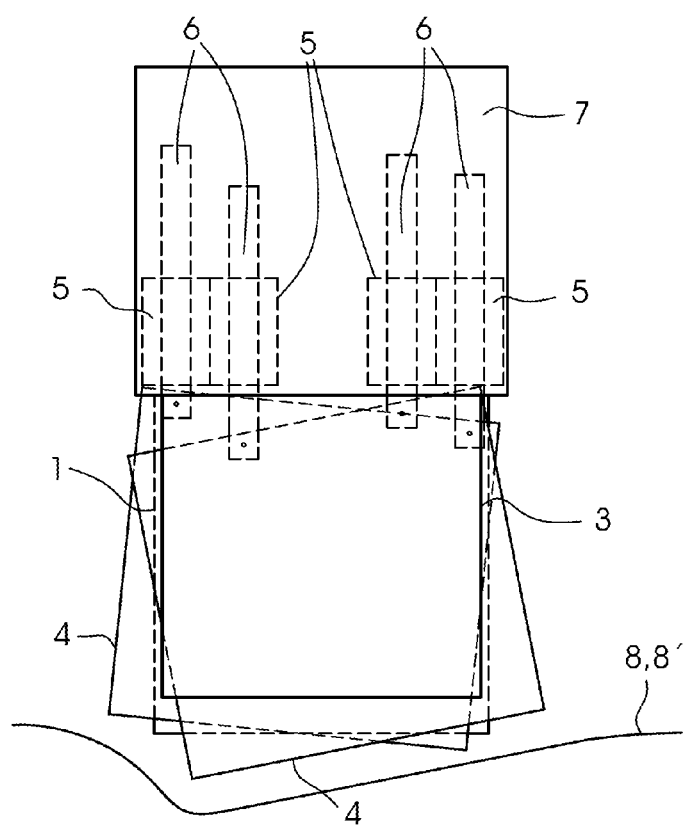
FIG. 3E is a diagrammatic, front-elevational view of a further preferred exemplary embodiment of an apparatus according to the invention.

FIGS. 3C, 3D and 3E each show a diagrammatic front view of a further preferred exemplary embodiment of an apparatus according to the invention. In FIG. 3C, the shielding unit 4 is deformable and has a plurality of actuators 5, in particular three. These actuators permit the shape of the shielding unit, in particular the lower edge 14 thereof, to be adapted even better to the lateral contour of the object surface 8. The deformability can be provided, for example, by dividing a plate into two, so that the parts can be adjusted and/or pivoted with respect to each other. Alternatively, provision can be made to configure the shielding unit flexibly, for example by providing two flexible shields with a frame and a covering, e.g. made of metallic material or rubber. Once more alternatively, the shielding unit can also be composed of a multiplicity of slats (disposed beside or behind one another), which can be moved and/or pivoted with respect to one another. FIGS. 3D and 3C show such alternative technical configurations.

As an alternative to all of the exemplary embodiments shown, provision can also be made for the object 8' to be moved instead of the printing unit 1 and the radiation unit 3. It is only important that a relative movement is actively produced between the units 1, 3 and 4 and the object, so that the surface 8 of the object can be printed on paths and the imprint can be treated. This alternative is suitable for small objects.

A further alternative provides for the shielding unit 4 to be actuated mechanically by levers or the like, which make contact with the object surface 8 during the forward movement of the apparatus.

In turn, a further alternative provides for the shielding unit 4 to be moved into a shielding position and/or deformed before the start of printing and to remain in this position during the printing. This alternative is suitable when objects which, for example, have a fixed curvature, such as bottles or tubes, are to be printed.

The invention claimed is:

1. An apparatus for the printing and radiation treatment of a curved surface of an object, the apparatus comprising:
   a printing unit;
   a radiation unit;
   a movement unit either moving said printing unit and said radiation unit at a working distance along the surface of the object or moving the object at a working distance along said printing unit and said radiation unit, said movement unit being a jointed-arm robot with 3, 4, 5, 6 or 7 degrees of freedom or a robot with a plurality of linear axes or axes of rotation;
   a shielding unit being at least one of adjustable or deformable at least one of relative to said printing unit or relative to said radiation unit and during printing;
   at least one actuator deforming said shielding unit; and
   a control unit activating said at least one actuator during a movement of said printing unit and said radiation unit or during a movement of the object and deforming said shielding unit to keep another working distance between said shielding unit and the surface of the object within a predefined working range.

2. The apparatus according to claim 1, wherein said printing unit is an inkjet print head and said radiation unit is an infrared dryer, an ultraviolet dryer or a hot air dryer.

3. The apparatus according to claim 1, wherein said at least one actuator is at least one linear drive.

4. The apparatus according to claim 1, wherein said printing unit and said radiation unit are disposed adjacent one another and form a gap therebetween, and said shielding unit is disposed in said gap.

5. The apparatus according to claim 4, wherein said shielding unit includes a plurality of plates, at least one of said plates is disposed in said gap and at least one of said plates is disposed at each respective side of at least one of said printing unit or said radiation unit.

6. The apparatus according to claim 1, wherein said printing unit, said radiation unit and said shielding unit are disposed on said movement unit.

7. The apparatus according to claim 1, wherein said working distance is maintained during movement of the apparatus.

8. The apparatus according to claim 1, wherein said shielding unit is a plate being divided into two parts, and said two parts are at least one of adjustable or pivotable with respect to each other providing deformability of said shielding unit.

9. The apparatus according to claim 1, wherein said shielding unit is flexible.

10. The apparatus according to claim 9, wherein said shielding unit has two flexible shields with a frame and a covering.

11. The apparatus according to claim 10, wherein said flexible shields, said frame and said covering are made of metallic material or rubber.

12. The apparatus according to claim 1, wherein said shielding unit is formed of a multiplicity of slats disposed beside or behind one another and being at least one of movable or pivotable with respect to one another.

13. An apparatus for the printing and radiation treatment of a curved surface of an object, the apparatus comprising:
   a printing unit;
   a radiation unit;
   a movement unit either moving said printing unit and said radiation unit at a working distance along the surface of the object or moving the object at a working distance along said printing unit and said radiation unit;
   a shielding unit being at least one of adjustable or deformable at least one of relative to said printing unit or relative to said radiation unit and during printing;
   a plurality of actuators deforming said shielding unit and permitting a shape of said shielding unit to be adapted to a lateral contour of the object surface; and
   a control unit activating said at least one actuator during a movement of said printing unit and said radiation unit or during a movement of the object and deforming said shielding unit to keep another working distance between said shielding unit and the surface of the object within a predefined working range.

14. The apparatus according to claim 13, wherein said plurality of actuators includes three actuators.

15. An apparatus for the printing and radiation treatment of a curved surface of an object, the apparatus comprising:
   a printing unit;
   a radiation unit;
   a movement unit either moving said printing unit and said radiation unit at a working distance along the surface of the object or moving the object at a working distance along said printing unit and said radiation unit;
   a shielding unit being at least one of adjustable or deformable at least one of relative to said printing unit or relative to said radiation unit and during printing, said shielding unit having a lower edge with a shape;

a plurality of actuators deforming said lower edge of said shielding unit and permitting said shape of said lower edge of said shielding unit to be adapted to a lateral contour of the object surface; and a control unit activating said at least one actuator during a movement of said printing unit and said radiation unit or during a movement of the object and deforming said shielding unit to keep another working distance between said shielding unit and the surface of the object within a predefined working range.

* * * * *